United States Patent [19]

Alpert et al.

[11] 3,761,685

[45] Sept. 25, 1973

[54] DATA PROCESSING MEANS WITH PRINTED CODE

[75] Inventors: Norman Alpert, Scarsdale, N.Y.; Robert M. Berler, Westport; Nanjundian N. Murthy, W. Redding, both of Conn.

[73] Assignee: Pitney-Bowes Alpex, Inc., Danbury, Conn.

[22] Filed: May 24, 1971

[21] Appl. No.: 146,044

[52] U.S. Cl. .................... 235/61.11 E, 235/61.12 R

[51] Int. Cl. .............................................. G06r 7/10

[58] Field of Search ............. 235/61.11 E, 61.11 D, 235/61.7 B

[56] References Cited

UNITED STATES PATENTS

| | | | |
|---|---|---|---|
| 3,543,241 | 11/1970 | Leuck | 235/61.11 E |
| 3,617,707 | 11/1971 | Shields et al. | 235/61.11 E |
| 3,598,964 | 8/1971 | Dell et al. | 235/61.11 E |

*Primary Examiner*—Thomas A. Robinson
*Attorney*—Arthur J. Plantamura

[57] ABSTRACT

An electro-optically readable coded document is provided in which the code appears as a compact row of printed bars of two widths separated by spaces of similar widths between the individual bars. The combination of printed bars or lines and associated spaces constitute a binary code that is registered through an electro-optical system, e.g. a hand-held reader. The reader is drawn along the length of the document, and as the printed lines (or bars) and spaces are traversed by the scanning reader, the width of each one of these elements is memorized in terms of a cumulative time count within a responsive electrical system. As the scanner thereafter traverses the space adjacent to the preceding bar, a new time count is generated in the electrical system which then measures the width of the space also in terms of a cumulative time count. The two time counts are compared in order to determine the character of the scanned portion of the encoded information.

11 Claims, 10 Drawing Figures

INVENTORS.
NORMAN ALPERT
ROBERT M. BERLER
NANJUNDIAH N. MURTHY
BY:
Arthur J Plantamura
ATTORNEY.

INVENTORS.
NORMAN ALPERT
ROBERT M. BERLER
NANJUNDIAH N. MURTHY
BY: Arthur J. Plantamura
ATTORNEY.

DATA PROCESSING MEANS WITH PRINTED CODE

BACKGROUND OF THE INVENTION

This invention relates to an improved data processing system of the kind disclosed in our pending U. S. Patent application, Ser. No. 58,762, filed on July 28, 1970, titled Data Processing System and Reader Therefor in which encoded information in the form of rows of printed lines which are of substantially uniform width and are separated by controlled spacings communicate encoded intelligence. To transmit the encoded information, a photoelectric scanning reader converts the bars and spaces into electrical signals that are applied to logic networks which in turn convert the scanned code into other forms of data.

Codes and code "readers" have been in commercial and industrial use for many years. Merchandise tickets, for example, are a typically well-known commercial application of coded intelligence. These tickets often are used in retail stores for accounting, billing and inventory control purposes. Experience has demonstrated, however, that data punched into or printed on these tickets often leads to error because of the various human functions that, normally are involved in the usual encoding and decoding process. As disclosed in our aforementioned copending application, Ser. No. 58,762, this source of error may be substantially overcome through a novel electro-optically readable code that is printed on a document with a series of lines of uniform width or thickness; the spacing between these lines is adjusted so that a combination of lines and spaces constitute a code, e.g. a binary coded decimal system such as the 1, 2, 4, 7 binary code comprised of combinations of "one" bits and "zero" bits. The associated electro-optical reader system converts the encoded combination of lines and spaces into a sequence of electrical signals as the reading device is moved across the merchandise ticket. As noted in that application, the line and space groupings as printed on the document are not in a binary coded form. Instead, the sequence of signals from the electro-optical reader initiates a decodable response in a logic network, which, in turn yields the encoded information in the form of a digital or binary signal.

In that application, each of the uniformly wide printed lines, when registered by the reader, acts as a combination clock or synchronizing mark. The printed line and logic network of the system disclosed therein requires that part of the bar and space array be used to provide a dimension with which the space which follows in sequence is compared. In other words, the detection of a bar within the scan of the reader functions as a synchronizing mark to indicate that information will follow within a prescribed time. Use of a reference or comparison bar in the code format imposes the requirement of additional spacing which, from the standpoint of compactness, is a disadvantage. Stated otherwise it is desirable to provide a code format which does not require "extra" bars or lines which function solely as reference measurement elements.

SUMMARY OF THE INVENTION

The present invention, in which both printed bars and the spaces between them function as data bits, permits a substantially more condensed format which takes up less space for printing and thus represents a significant improvement over the foregoing technique by providing a higher digit per inch of printed space density.

The concept employed in practicing the present invention utilizes an array of printed bars (or lines) and spaces between these bars in which the bars and spaces are presented in two different widths; a first width whether a bar or a space between bars representing a zero bit and a second width representing a one bit. Whereas formerly it was considered necessary to have an array of four uniformly wide printed bars and three spaces of controlled varying width for a five bit digit in which the first bar was used as a dimension reference against which the space which followed was compared, in accordance with the present invention an array of only three printed bars having one of two widths and two spaces, also having one of said two widths, will suffice to represent the same information. Additionally the novel format of the present invention permits expansion of the coding system into a full alphanumeric capability of seven bits which is nevertheless compatible with the more abbreviated five bit system.

In scanning the array of lines and spaces, the reader triggers the counter as it senses the first printed line or bar and its width, in terms of a time count, is memorized within the system. Preferably, its lines are printed in black ink. When the reader passes over the space adjacent to this first printed line, a new time count is generated which is coextensive with the width of the space and a comparison is made electronically to determine whether the time count of the space is greater, equal to, or less than the count of the first bar or line. This process continues over the array of lines and spaces, the time count for each mark being compared with the time count of the adjacent respective space comparison information. This is referred back to previous bar and space comparisons which are consequently assigned their proper respective bit values.

One very important aspect of this invention relates to the preferred code as discussed in greater detail hereafter wherein the combination of wide and narrow bars is of such a character that any attempt to widen a bar at the expense of an adjacent space will invariably raise the encoded number to some higher value. In this way, losses due to fraudulently or otherwise improperly altered merchandise tags inevitably will frustrate the wrongdoer and thereby contribute to the general reduction of retail business losses.

For a more detailed description and fuller appreciation of the invention, attention is invited to the drawing and detailed description, the scope of the invention being characterized by the claims.

DESCRIPTION OF THE PREFERRED EMBODIMENTS

In order to afford a full understanding and appreciation of the invention, a specific embodiment will be described in conjunction with segments of the bar and space binary system. It will be readily understood by those skilled in the art that the code format of the present invention may comprise printed documents such as a merchandise ticket 110 illustrated generally in FIG. 6.

In accordance with the invention, a compact bar code lends itself to printing a high digit density while at the same time easing the burden placed on the printing process. For example, a five bit bar code of the present invention requires three bars and two spaces and a seven bit code requires four bars and three spaces, which is substantially more efficient and compact than other coding systems that have characterized the prior art.

The bars as applied to the supporting substrate for the ticket, or the like, have two different widths, one width representing a zero bit and the other width, a one bit. In a similar manner, the spaces that are established between successive bars also are established in two widths, each representative of a specific bit value. In the illustrative embodiment of the invention, wide bars and wide spaces each have the same bit value. Narrow bars and spaces also are assigned equal bit values which are, of course, different from those values which were assigned to the wide bars and spaces. These value assignments are well adapted to a binary coding system. It may be preferable in circumstances other than those which are described herein to assign different values to the bar and space indicia, as appropriate.

It will be understood that while the invention makes reference to two different widths, the concept affords considerable tolerance. In other words, the important criteria is the capability to determine whether one bit or the other is intended. Consequently, bars and spaces which are detected as differing by less than about 40 percent of each other in width as determined by the comparative count may be assumed to be equal, i.e. the same bit, while those differing by a greater quantity are assumed to be different.

Figure 1:
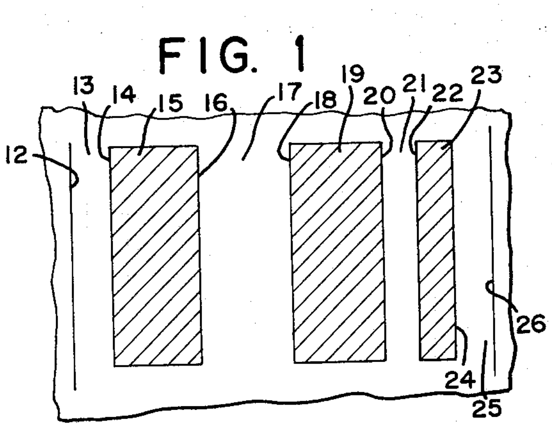
FIG. 1 represents in enlarged detail a single digit portion of a typical code array in the form of lines (or bars) and spaces for a three-bar five bit code in accordance with the principles of the invention.

A specific illustration is shown in FIG. 1, in which the encoded digit is represented by a five bit code. If a digit density, for example, of ten digits to the inch is desired, the bars and spaces of the code will be printed with the following dimensions: Wide bars or thick lines 15 and 19 and wide space 17 will be made to be 0.021 inches thick. The narrow or thin line or bar 23 and the narrow space 21 will be made to be 0.008 inches thick. The guard bands 13 and 25 on each side of the coded bar groups may have a dimension of 0.009 inches. These guard bands 13 and 25 establish a zone between the first bar in a code group and the edge of the printing band that are used to imprint the code groups on the tickets. The guard band provides a tolerance for manufacturing variations that prevent the edge of the band from encroaching on the code bar.

In the illustrative embodiment of the invention shown in FIG. 1, each guard band has a width of 0.009 inches, selected for a 10 digit/inch digit density. The guard band width preferably is reduced to 0.005 inches, if a density of 15 digit/inch is sought. More specifically in the illustration shown in FIG. 1 the bits have the following dimensions:

| | |
|---|---|
| Left Guard band from margin **12** to the leading edge **14** of the wide printed mark **15** | 0.009 inch |
| First wide bar **15** from leading edge **14** to trailing edge **16** | 0.021 inch |
| First wide space **17** from trailing edge **16** to leading edge **18** | 0.021 inch |
| Second wide bar **19** from leading edge **18** to trailing edge **20** | 0.021 inch |
| Narrow space from trailing edge **20** to leading edge **22** | 0.008 inch |
| Narrow bar from leading edge **22** to trailing edge **24** | 0.008 inch |
| Right guard band from trailing edge **24** to margin **26** | 0.009 inch |

To give a total width of from 12 to 26 of 0.097 inch.

As shown in Table I, this five bit code is capable of yielding the following digits or symbolic assignments: 10 combinations of the 3 out of 5 for the digits zero to nine; 4 combinations of the 2 out of 5 for start stop symbols; and 5 combinations of the 1 out of 5 for general symbols. As hereinbefore mentioned, this specific code when printed has a digit density of about ten to the inch.

Shown in the table below are the code sets where the maximum number of bits is five. Three sets are shown.

TABLE I

| 3 out of five Code | 2 out of 5 Code | 1 out of 5 Code |
|---|---|---|
| 1 1 1 0 0 | 0 1 1 0 0 | 0 0 0 0 1 |
| 1 1 0 1 0 | 1 1 0 0 0 | 0 0 0 1 0 |
| 1 1 0 0 1 | 1 0 0 1 0 | 0 0 1 0 0 |
| 1 0 1 1 0 | 1 0 1 0 0 | 0 1 0 0 0 |
| 1 0 1 0 1 | 0 0 1 1 0* | 1 0 0 0 0 |
| 1 0 0 1 1 | 0 0 0 1 1* | |
| 0 1 1 1 0 | 1 0 0 0 1* | |
| 0 1 1 0 1 | | |
| 0 1 0 1 1 | | |
| 0 0 1 1 1 | | |

*In the start and stop codes directionality of scanning is important; accordingly, mirror changes of the coded data bits are not utilized.

The three bar two space code may, without further expansion, be wholly adequate for many purposes, of which the merchandise labels and tags used in conjunction with the point of sale recorder and optical scanner system described in copending application, Ser. No. 58,762 are typical.

Figure 2:
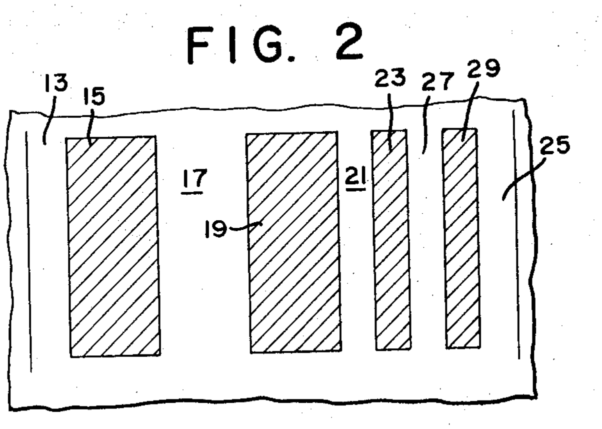
FIG. 2 represents in enlarged detail a single digit portion of an expanded code array in the form of another embodiment of the present invention which comprises a four-bar seven bit code.

In order to expand this coding system into a full alphanumeric capability while still maintaining compatability between the five bit system and the expanded system, modifications may be made to the code. As illustrated in FIG. 2, these modifications can include the addition of one extra narrow bar 29 and one extra narrow space 27 to the five bit group described in connection with FIG. 1. These two additional indicia, moreover, are added to the right-hand end of the five bit group viewed in FIG. 1 of the drawing. Thus, the coded group shown in FIG. 2 consists of four bars, 15, 19, 23, and 29, and three spaces, 17, 21, and 27. This seven bit group occupies an additional 0.016 inches because the bar 29 and the space 27 each are 0.008 inches wide. The total width of this seven bit code group for a single digit occupies 0.113 inches (0.097 + 0.016 inch = 0.113 inch), to provide a digit density of approximately 8.85 digits per inch.

If a high resolution printer is used, the bar and space widths each may be reduced by about 15 per cent in thickness from the values shown in FIGS. 1 and 2. If high resolution printing is used to achieve this saving in width, a digit density of ten to the inch is, nevertheless, still attainable. The seven bit code, an illustrative portion of which is shown in FIG. 2, yields 35 digit combinations. Moreover, through a further application of digital logic, it is possible to extract thirty-six distinct combinations from the seven bit code as shown in the table below.

This four bar three space code may function as a 3 out of 7 code 2 out of 7 code 1 out of 7 code 3 out of 5 code 2 out of 5 code or 1 out of 5 code

| | Code Bits 1 2 3 4 5 | 6 7 |
|---|---|---|
| For numbers | Three out of five | 0 0 |
| For alphabet | One or two out of five | One or two out of two |
| *For the letter "Q" (1 out of 7) | 0 0 0 1 0 | 0 0 |

*Because there is one less than the desired total number of 36 in the code combination of 3 out of 7, to provide both alphabetic and numeric capabilities the letter Q, which is used infrequently, is treated as an exception.

The bar and space width comparison method used in this invention has a markedly improved efficiency over the system described in U. S. Patent application Ser. No. 58,762. For example, the present invention eliminates the need for the extra bar at the beginning of the coded bar group which acts as a standard with which width measurements are compared. Thus, for a five bit digit, three bars and two spaces will suffice according to the arrangement of the instant invention, whereas four bars and three spaces are needed in accordance with the format of that earlier application. Thus, in the system described in application Ser. No. 58,762, the first bar merely provides a dimension from which the following space width is compared; this first bar does not provide a data bit. The novel code system of the present invention, however, does provide both a width reference and a data bit, thereby providing significantly more compact data packaging. Hence, a substantially higher digit per inch density is possible. Conversely, if the previous digit density of the code format of said copending application Ser. No. 58,762 is satisfactory, then the printed bars of the format of the instant invention may be made thicker, and have wider printing resolution tolerances.

Figure 3:
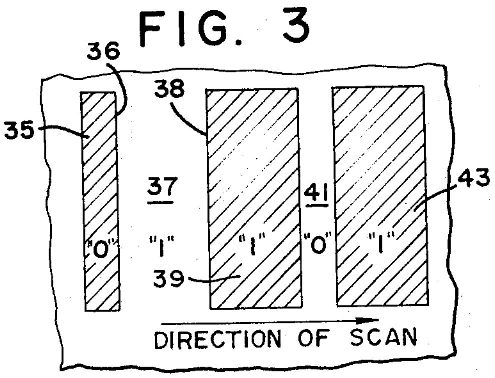
FIG. 3 represents an enlarged segment of the line and space printed document showing an array corresponding to one digit illustrating also the associated information bits.
Figure 8:
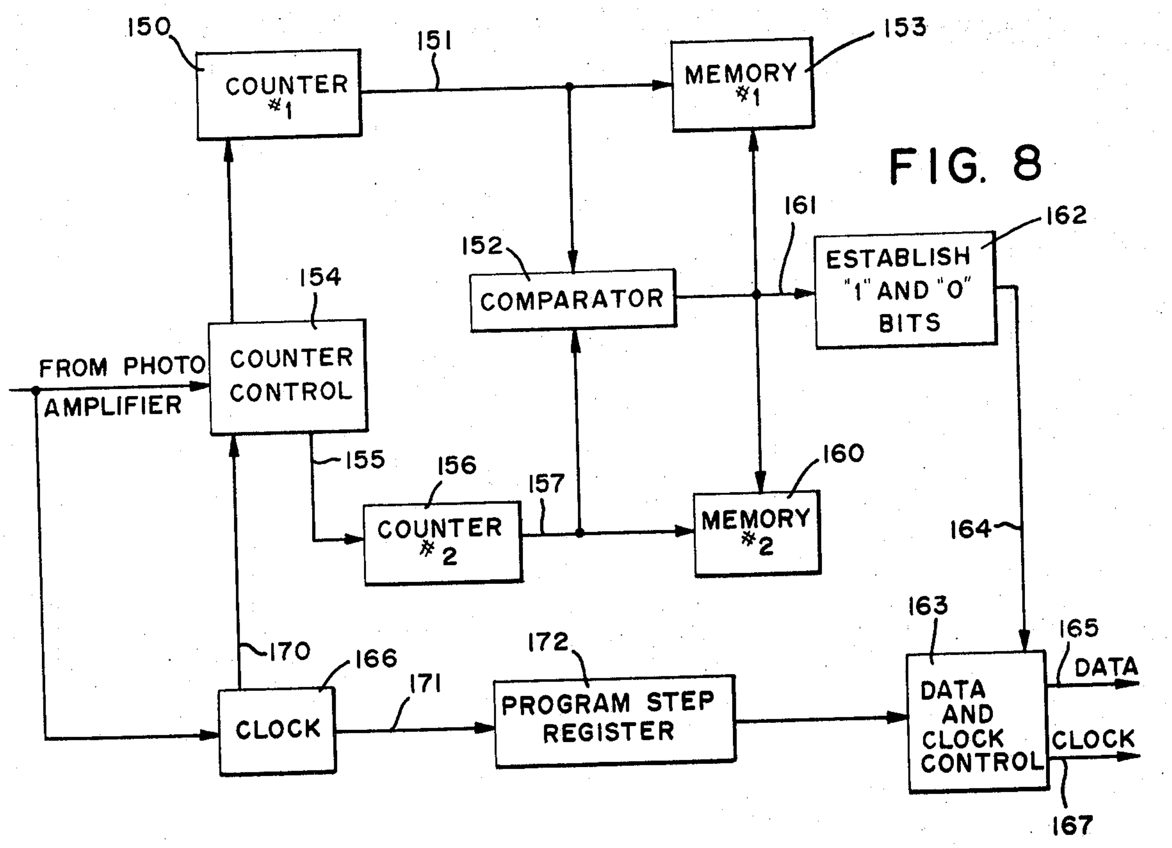
FIG. 8 is a block diagram illustrating a typical system for use in connection with the invention.

A technique for analyzing the "zero" and "one" bits that are stored in the coding system is described by reference to FIG. 3. As shown, moving from left to right as viewed in the drawing, the first bar 35 is registered by the scanning reader, such as that of FIG. 7 and its width is memorized in terms of an electrical time count that was initiated in response to the leftmost edge of the bar 35 and terminated in response to the scanner's passage over the right-hand trailing edge 36 of the bar 35. Next in sequence as the scanner begins to pass over the adjacent space 37, a new time count is commenced in the electrical system in order to measure the width of the space 37 from the trailing edge 36 of bar 35 to the leading edge 38 of bar 39. The electrical system compares the accumulated bar 35 count with the space 37 count to determine if the count registered as the scanner passed over the space 37 is greater or less than the count registered as the scanner passed over the bar 35. As seen in FIG. 3, the count acquired while scanning the space 37 will be greater than that which was accumulated when scanning the first bar 35. Consequently, the space 37 has a bit value of "1," and the narrower bar 35 has a bit value of "0." It will be understood that the reverse value may be assigned so that the wide bands represent an "0" and the narrow bands a "1." As the scanner continues to sweep across the code, a new count is initiated at the leading edge 38 when the scanner passes over the second bar 39. This count is then compared with the cumulative count acquired while scanning the preceding space 37 that was retained in a memory (FIG. 8). The count acquired in scanning the second bar 39 when compared is equal to the count registered when the preceding space 37 was scanned. Therefore, the bit value of the second bar 39, which by count comparison is determined to be wide, also has a value of "1." The scanner then traverses the second space 41. The count generated as this space is scanned is less than the previous bar count, indicating that the space 41 has a bit value of "0." When the scanner passes over the final bar 43, the accumulated count during this scan is greater than the count registered when the narrow space 41 was scanned; the bar 43 thus has a bit value of "1."

Figure 4A:
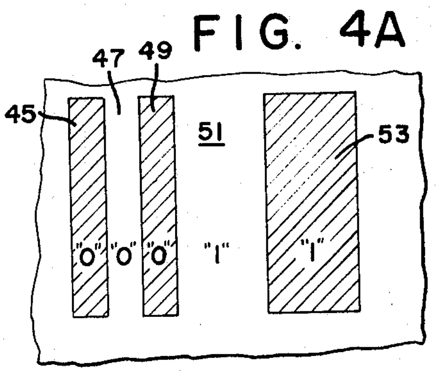
FIGS. 4A and 4B illustrate further representations of enlarged segments of documents employing the line and space array of the invention.
Figure 4B:
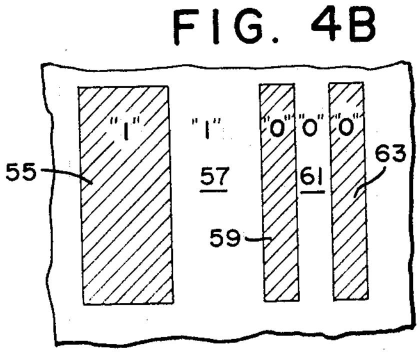

As shown in FIGS. 4A and 4B, if as the scanning commences the distances across the width are equal, the bar and space width comparison is made when a width change does occur, as, for example, in the coded group of FIG. 4A, at the fourth data bit 51 of this digit. The bar and space width comparison is accomplished in this situation through reference to the preceding bars and spaces in order to properly assign bit values. In this instance, each data bit must be held in a memory until the appropriate bar and space width comparisons can be executed.

An important advantage of this system, when used with a scanner containing a single photosensor, is the accommodation of various print densities without changing the scanner or the electrical system, thus the same equipment can decode high or low density codes interchangeably.

If the higher density code is desired, e.g. a digit density of 15 to the inch, a high quality print of the code of the sort provided by a letter press can be used.

In the foregoing illustrations, the bar code format is arranged and described so that the narrow bar or space would represent an 0 bit and the wide bar or space would represent a 1 bit. When the reverse assignment of codes is used, i.e. so that the narrow width represents a 1 bit, the latter assignment of bar and space widths enables a three out of five code to occupy less space per digit. However, this does not apply to a three out of seven code of the sort shown in FIGS. 5A and 5B. As shown therein, reverse bit value assignments can be used, if required.

Figure 5A:
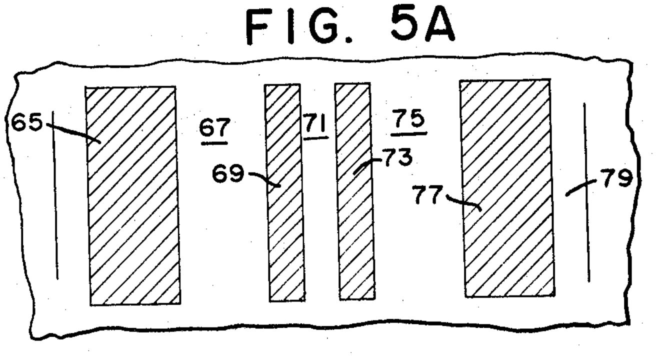
FIGS. 5A and 5B illustrate two additional representations of enlarged segments of printed documents in which different arrays provide the same information.
Figure 5B:
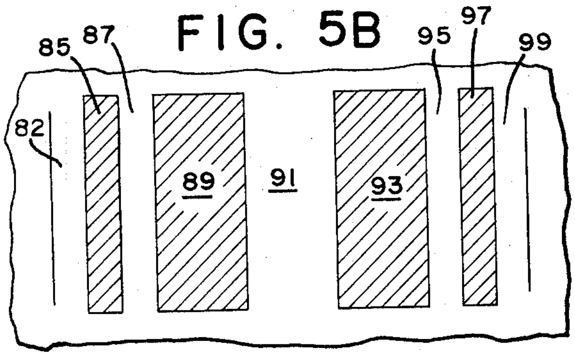

FIGS. 5A and 5B, show two identical representations of a three out of seven bit bar code. These figures illustrate that if the 1 bit value is assigned to the wide space 91 (FIG. 5B) and wide bars 89 and 93, then the code will occupy less linear space that that which characterizes the reverse as shown in FIG. 5A. In FIG. 5A, for example, the "one" bits are represented by the narrow bars 69 and 73 and the narrow space 71. Conversely, the zero bits are assigned to the wide bars 65 and 77 and to the wide spaces 67 and 75. The space savings becomes much more pronounced in FIG. 5B when a two out of seven or a one out of seven code is used. By proper assignment of the relatively wide bar and space in the proper sequence in the printed format, we have found that a tamper free format, i.e. an arrangement which inhibits alteration may be devised. An illustration is provided by reference to a three out of five coding assignment designated in the following table wherein the bit assignment "1" which would be shown in printed format as a wide bar or wide space is shown as a double dash, or a double space, and the bit assignment corresponding to "0" which would normally be shown in printed format as a narrow bar or narrow space is shown as a single dash or single space, respectively.

| Digit | Code Bit Array | Bar Code Representation |
|---|---|---|
| 0 | 0 1 1 1 0 | –  ——  – |
| 1 | 1 1 0 1 0 | ——  –  – |
| 2 | 0 1 0 1 1 | –  –  —— |
| 3 | 0 1 1 0 1 | –  —— —— |
| 4 | 1 0 1 1 0 | —— ——  – |
| 5 | 1 1 0 0 1 | ——  – —— |
| 6 | 1 0 0 1 1 | —— –  —— |
| 7 | 0 0 1 1 1 | – ——  —— |
| 8 | 1 1 1 0 0 | ——  —— – |
| 9 | 1 0 1 0 1 | —— —— —— |

Attempts to alter the code, as will be seen by attempting (where possible) to add another dash to the right or left of a single dash, would take the form of making a narrow bar wider. Were this to be done in the case where the code reference is to price, it is seen that this would have the effect in all cases of increasing the price over that intended, i.e. tampering would result in altering the price upward in each case. Reference to the bar code representation in the table in which the single dash represents a narrow bar and the double dash a wide bar, shows that attempts to change the bit designation for zero by enlarging one or both thin lines (i.e. single dash to double dash) would convert it to either of the digits 3, 4 or 9; attempted change of one or both of the narrow bars (i.e. single dashes) to wide bar (i.e. double dash) would convert the digit "one" to either of the digits 4, 5, 8 or 9; likewise attempted alteration of digit 2 would yield digits 3, 7 or 9, and attempted alteration of digits 3, 4, 5 and 6 would yield digit 9. Digits 7, 8 and 9 as seen would not permit tampering within the allowable tolerance.

Figure 6:
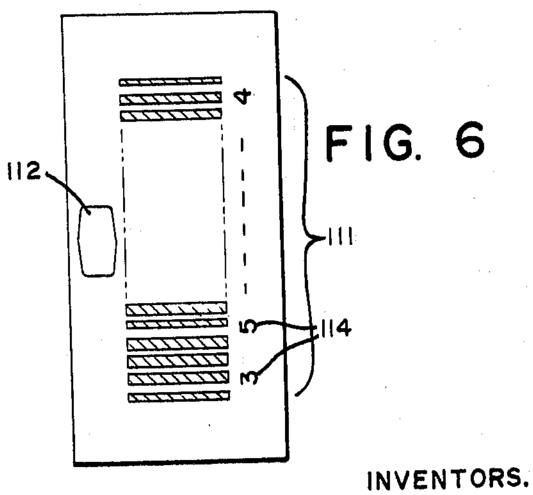
FIG. 6 is an illustrative representation of a coded document in which the code comprises an assemblage of printed lines and spaces which are substantially enlarged to show detail in accordance with the invention.

The ticket 110 shown in FIG. 6 illustrates a typical document encoded in accordance with the terms of the present invention. The ticket 110 has a shape and general arrangement similar to coded merchandise tickets of the type that are stitched or pinned to articles of clothing or other general consumer merchandise. In addition to the line and space printed code 111, the ticket

110 may also carry a suitable "LOGO" and/or other indicia 112 that is readily interpreted by humans and correspond, for example, to the code 111 which is impressed as numerals and letters 114. The binary notation, moreover, employed for the code may be any appropriate binary system of the kind well known to those skilled in the art.

Figure 7:
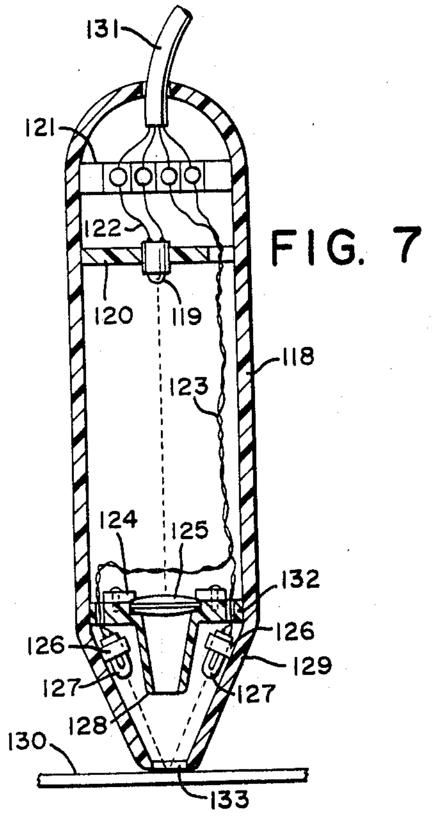
FIG. 7 illustrates a typical photo-optical reader which may be employed in reading the coded document of the invention.

A typical reader for scanning and photo-optically decoding a document that characterizes the invention is depicted in FIG. 7. The unit comprises a light tight housing 118 which terminates in a conical tip portion 129 which has formed at the end thereof an opening 133 through which the luminous contrasts that comprise the data on document 130 are transmitted. Mounted internally, near the tip 129 of the reader, is a combination light baffle, lens and light source support which comprises a lens enclosure or cell 124 for the lens 125, a horizontal baffle portion 132 and a conical baffle portion 128. The opening in the conical portion 128 is aligned with the lens 125 and a photoelectric sensor 119. The baffle arrangement 132 and 128 prevents an undesirable activation of a photosensor 119 by stray light from lamps 126. The photosensor 119 is secured to a suitable support 120 and connected through conductors 122, the terminal strip 121 and the cable 131 to a data processing system (not shown in FIG. 7). The conductor to supply the light source 126 and photosensor 119 also are connected through the terminal strip 121. Although a single lamp 126 may provide sufficient illumination, it is preferable to use a system of at least three lamps to provide adequate light intensity in all operating conditions and for better assurance against malfunction from lamp failure.

Lamps 126 with lens tips 127 preferably are oriented to concentrate or focus the light and provide one bright spot on the document 130.

In order to resolve the line pattern on the coded printed document, the reader must have an area spot resolution that is at least equal to, and preferably smaller than the width of the thinnest line or space. The illumination is provided by one or more lamps which may use a lens to focus the light on a spot, or may use "fiber optic" light pipes (not shown) within the housing 118.

The following system logic, viewed in conjunction with FIG. 8, may be utilized to decipher the code of the present invention. A test is first made to determine if the first consecutive bar and space are very nearly equal, i.e. within the tolerance adopted, which is preferably less than a 40 per cent difference in counts, to ascertain whether bits of the same or of different widths have been printed. If the widths, i.e. the counts, differ by more than the prescribed 40 per cent tolerance and are thus unequal, the ones and zeros of the binary coded decimal system are immediately established. The memory is utilized only as needed so that if two widths in sequence are dissimilar, the memory is not used. Thus, assuming that the narrow bar or space has been accorded a zero bit value, then the smaller width bar or space, as detected by a smaller count in the counter, reflects a zero bar or space width, while the wider bar or space clearly indicates a bit value of 1. In this way, successive bars can be compared with the previous bars (or spaces) and one or zero bit decisions can easily be made.

However, as hereinbefore mentioned, if the first two bars are of equal width, then the one-zero decision is held in abeyance because the cumulative counts for both indicia are about the same, thereby establishing the ambiguous condition in which the counts can reflect either one's or zero's. When the first two bars are of equal width as denoted by a substantial equality in the respective counts, the decision is postponed by retaining the similar count in one of the memories until a dissimilar count is obtained; at that point, the 1 and 0 bits are established.

If, in scanning, the third band (i.e. the second bar width) is substantially equal to the first bar and to the second space widths, then the fourth width will have to be interrogated until a substantial count difference is registered, at which time a one-zero comparison is completed that is effective for all accumulated indicia counts.

It is thus seen that as the code of the invention is scanned and the reader selects a black bar of the code, a first counter starts its count and continues until the transition to a white space is detected. This counter information is also accumulated in memory as the reader moves across the array. At the transition from the first bar to a space, the first counter stops and a second counter starts which accumulates a count until the transition to the next bar when the second counter stops and the first counter begins again. As the count is accumulated in the second counter, it also is recorded in the second memory. At this point, there are two counts one in each of the respective counters and in the two memories. If the two counts are equal, the information is retained in the memory and cleared from the counter which may then be used for the next count. If the counts are unequal the 1 and 0 bits are established immediately without the need for the memory.

Discrimination between one size and the other of the bar or space widths is determined in a manner similar to the counting technique described in the above mentioned application Ser. No. 58,762. A first counter 150 (FIG. 8), e.g. a multivibrator, begins to count as a reader 118 (FIG. 7) sweeps across the leading edge of an initial coding bar. These counts are sent through a conductor 151 to a comparator circuit 152 and to a memory circuit 153. The comparator 152, for example, can be a conventional digital comparator that stores a first incoming sequence of pulses or counts and subtracts a second incoming count sequence in order to leave a pulse residue or remainder, if appropriate. The memory 153 also is of conventional design and may be of the ferrite type, or an array of flip-flops for storing the pulses received from the counter 150 for subsequent readout, as required. When the scanning device leaves the terminal portion or trailing edge of the bar and enters a space, the count in the counter 150 is stopped in response to the change in the signal from the photooptical reader that is sent through an amplifier (not shown) to the counter control 154. As hereinbefore mentioned, the photo-optical reader responds to the difference in light intensity that is reflected from a bar and a space by generating electrical outputs that are related to the degree of stimulation. Logic within the counter control circuit 154, of which diode-diode logic or diode-transistor logic is typical, responds to the difference in signal intensity that reflects the "space" light output, by sending a command signal through a conductor 155 that initiates counting at a "space" counter 156.

The space counter sends a train of pulses through a conductor 157 to the comparator circuit 152 and a memory circuit 160. The memory circuit 160 is of a construction that is similar to the memory 153. If there is a residue of a preselected polarity at the output of the comparator 152, wide indicia followed by narrow indicia is indicated, showing that a one-zero relation is present. A signal reflecting this residue is gated through a conductor 161, if pulses are once more received in the comparator 152 from the bar counter 150, to a recorder 162, or the like, which establishes an indication of the actual binary number that was encoded on the coded document or ticket.

Similarly, if a residue of a different polarity appears at the output of the comparator 152, narrow indicia followed by wide indicia is indicated, to show that a zero-one relation was established. In the foregoing circumstances the memories 153 and 160 are erased on a command that corresponds to the time-gated output from the comparator. Zero and one bit signals also are sent from the recorder 162 through to a data and clock control circuit 163 through a conductor 164 for gating to a data bank (not shown) through a conductor 165. Clock operation is initiated in response to the simultaneous arrival of a reader pulse and a command pulse from the clock control 163. The clock 166, sends pulses through a conductor 170 to activate the counter control 154 and the counter circuits 150 and 156. The clock sends further signals through a conductor 171 to a program step register circuit 172 which advances the data control in response to received clock inputs.

It will be apparent to those skilled in the art that various modifications may be made in the system set forth without departing from the spirit of the invention. It is, therefore, understood that the foregoing description and drawing is to be interpreted as illustrative and not as limiting except for such limitations as may be set forth in the claims.

We claim:

1. A code consisting essentially of an array of printed substantially straight bars having two different predetermined widths, each of said bars being spaced from a subseqeunt bar in the array which is representative of encoded digits by a spacing that corresponds in width to one of said two widths, the first bar of said array functioning both as a width reference which, by duration of an electronic count in scanning, establishes the rate of scan, and as a binary code data bit, each of said widths of both said bars and spacings being representative of one of two bits of the binary code which is composed of the same number of one bits and zero bits for the individual digits of said code and each of said bits being distinguished by the respective bar or space width and being translatable via optical scanning and an electronic count corresponding to said width into binary symbols.

2. The code of claim 1 further characterized by utilizing the wider of said two widths as a "one" bit and arranging said bit assignments to the respective digits to provide a tamper-free code so that alteration of the array wherein a narrow bar is converted to a wide bar will thereby increase the value of the coded digit.

3. A data processing system comprising: a coded document having an array of printed bars in combination with spaces between said bars, each of said bars and spaces being substantially straight and being one of two predetermined widths, the first bar of said array functioning both as a width reference which, by duration of an electronic count in scanning, establishes the rate of scan, and as a data bit for a binary code, said combination providing means for storing optically decodable data by arranging the array in a sequence of widths corresponding to a binary notation which is decodable into binary intelligible symbols, electro-optical means for scanning and deriving signals from said bars and spaces to produce for each width an identifiable count which is coextensive with and in response to each of said widths and means for processing the combination of signals corresponding to said widths to register the data encoded in said printed bar and space combination.

4. A merchandise ticket having data encoded thereon comprising a tag suitable for receiving ink impressions thereon, said ink impressions consisting essentially of an array of substantially straight bars of two different widths representative of encoded digits, said bars having spaces therebetween corresponding in widths to those of said bars in accordance with a binary code, each of said bars and spacings in the array being a first width to represent one type of data bit of said code and being a second width to represent another type of data bit of said code, the first of said bars functioning as both a width reference which is utilized by means of the duration of an electronic count during scanning to establish the rate of scan and as a data bit of the encoded digit.

5. A merchandise ticket according to claim 4 wherein said tag is approximately one inch wide and on the order of three inches long, and one of said uniform bar and space widths being about 0.008 inch wide and the other bar and space widths being about 0.021 inch in width.

6. A data retrieval method comprising the steps of encoding a member with an array consisting essentially of bars of a thinner width and bars of a thicker width, each of said bars being spaced from the next adjacent bar by a space having a width that corresponds to the width of one of said thinner or thicker bars in accordance with a preestablished code, each of said bars and each of said spaces functioning as a code bit of a binary code, moving a photo reading device across said array of bars, initiating a count at a substantially fixed rate ad determined by the time required to cross and thereby scan the first of said bars in said array, said first bar functioning both as a reference width, which establishes the rate of scan, and as a binary code bit, initiating a new count during the time required to cross the space between said first bar and the next adjacent bar and continuing the initiation of a new count after scanning each of said bar and space widths said resulting counts being correspondingly representative of smaller and larger widths and being decodable into digits of a predetermined binary code.

7. The code of claim 1 including a start-stop code comprising said bars and spaces in an array whose representative binary code bit sequence is free of mirror-image sequences and which is indicative of directionality of scanning.

8. The data processing system in accordance with claim 3 wherein the code comprising the array of printed bars and spaces includes a start-stop code comprising said bars and spaces in an array whose representative binary code bit sequence is free of mirror-image sequences and which is indicative of directionality of scanning.

9. The ticket of claim 4 wherein the encoded data includes a start-stop code comprising said bars and spaces in an array whose representative binary code bit sequence is free of mirror-image sequence and which is indicative of directionality of scanning.

10. The code of claim 1 wherein the array of bars and spaces comprises a 3 out of 5 code.

11. The code of claim 1 wherein the array of bars and spaces comprises a 5 out of 7 code.

* * * * *